(12) United States Patent
McMillan

(10) Patent No.: US 8,998,280 B1
(45) Date of Patent: Apr. 7, 2015

(54) TOGGLE CAM RELEASE MECHANISM

(71) Applicant: John H. McMillan, Gig Harbor, WA (US)

(72) Inventor: John H. McMillan, Gig Harbor, WA (US)

(*) Notice: Subject to any disclaimer, the term of this patent is extended or adjusted under 35 U.S.C. 154(b) by 0 days.

(21) Appl. No.: 14/285,514

(22) Filed: May 22, 2014

(51) Int. Cl.
*F16B 45/02* (2006.01)

(52) U.S. Cl.
CPC .................... *F16B 45/025* (2013.01)

(58) Field of Classification Search
CPC ........ B63B 21/04; B63B 21/08; B63B 21/60; B25B 7/123; B66C 1/38; F16B 45/025; Y10S 292/49
USPC .......... 294/82.31, 82.32, 82.33, 82.24, 82.27, 294/104; 292/DIG. 49; 24/494
See application file for complete search history.

(56) References Cited

U.S. PATENT DOCUMENTS

| | | | |
|---|---|---|---|
| 839,036 A | 12/1906 | Roberts | |
| 1,435,634 A | 11/1922 | Foxhall | |
| 1,524,699 A | 2/1925 | Faber | |
| 1,813,294 A | 7/1931 | Hunt | |
| 2,024,222 A | 12/1935 | Hinchman | |
| 2,327,751 A | 8/1943 | Unthank et al. | |
| 2,350,999 A | 6/1944 | Beirise | |
| 2,426,099 A | 8/1947 | Hershowitz | |
| 2,473,764 A | 6/1949 | Park | |
| 2,565,172 A | 8/1951 | Firman | |
| 2,595,450 A | 5/1952 | Coffing | |
| 2,608,432 A * | 8/1952 | Coffing | 294/82.33 |
| 2,637,088 A | 5/1953 | Foster | |
| 2,714,731 A | 8/1955 | Binmore | |
| 2,736,599 A | 2/1956 | Coffing | |
| 3,109,676 A | 11/1963 | Mercer | |
| 3,145,040 A | 8/1964 | Phelps | |
| 3,761,122 A * | 9/1973 | Epstein | 294/82.33 |
| 3,923,333 A | 12/1975 | Whaley | |
| 3,979,803 A | 9/1976 | Clarke et al. | |
| 4,813,731 A | 3/1989 | Smith | |
| 4,850,254 A | 7/1989 | Burney | |
| 5,002,002 A | 3/1991 | Awalt | |
| 5,100,192 A | 3/1992 | McMillan | |
| 5,123,374 A | 6/1992 | McMillan | |
| 5,901,990 A | 5/1999 | McMillan | |
| 6,654,990 B2 * | 12/2003 | Liu | 24/598.5 |

FOREIGN PATENT DOCUMENTS

SU 783179 11/1980

* cited by examiner

*Primary Examiner* — Dean Kramer
(74) *Attorney, Agent, or Firm* — Patrick J. S. Inouye; Leonid Kisselev

(57) ABSTRACT

A release mechanism that decreases the effort necessary to release a tensile load is provided. The mechanism includes a connecting body that secures a member connected to a load between a fixed jaw and an opposing jaw, two floating links connected to a moveable jaw and to a moveable toggle pivot, and a moveable toggle that includes a central lever and two toggle links mounted on the moveable toggle pivot. A cam lobe is formed on the lever and rotation of the cam lobe against a flat rise included in the connecting body decreases the effort necessary to unlock the mechanism and release the load. The central lever is interspersed between the toggle links and can move between spacer/stops attached to each of the toggle links. The spacer/stops keep the lever from exceeding the prescribed range of motion.

20 Claims, 5 Drawing Sheets

SECT. A-A

TOGGLE CAM RELEASE MECHANISM

FIELD

This application relates in general to tools for securing tensile loads, and in particular, to a toggle cam release mechanism.

BACKGROUND

Securing and quickly releasing heavy tensile loads is crucial to safety and success in industries as wide-ranging as commercial fishing, oilfield operations, aerospace operations, barge tugging, and movie special effects. Considering the variety of conditions that tools employed for securing the loads must operate, characteristics, such as shape and size, of these tools can vary greatly, but the tools ideally should have two consistent qualities. First, the tools must be able to safely secure an anticipated tensile load. Second, the tools must allow the release of the tensile loads when necessary. Unfortunately, these qualities are hard to balance for tools designed to secure tensile loads of a significant weight.

Conventionally, the greater a weight of a load secured by a tool is, the more effort is necessary to release the load and the longer the release process takes. For example, pelican hooks and pin-shackles can handle tensile loads of a significant weight, but were not designed to be released while still under load; as a result, the effort necessary to release these tools rises sharply with the weight of the load. The same situation exists even with tools that were designed to be released under load, and typically, with loads exceeding eight tons, the effort to manually release a tool begins to exceed what a normal person is capable of accomplishing.

An example of the tool that was designed for being released while under load can be found in U.S. Pat. No. 5,901,990, issued May 11, 1999, to John H. McMillan, the disclosure of which is incorporated by reference. The U.S. Pat. No. 5,901,990 patent describes an improved toggle locking release mechanism that includes a connecting body, an opposing pivoted jaw, moveable lock/release links, and a moveable release lever. The mechanism uses pivoting of the lever on a fixed toggle pivot to control movements of the jaw and to lock and release the load secured by the mechanism. While the described mechanism offers numerous improvements over pre-existing devices, the mechanism still requires efforts of more than one person to release the load once the weight of the load reaches a certain amount. For instance, once the weight of the load approaches eight tons, the effort to release the load becomes about 65 kilograms, which is beyond the capacity of most people to apply. As the weight of the load continues to increase, releasing the load secured by the mechanism can require either specialized tools or coordinated efforts of multiple people; thus, the effort to release a load weighing about 77 tons using the mechanism can approach 640 kilograms. Considering that the use of the tools and coordinating the efforts of multiple people may not be easily achievable under harsh conditions, such as during a storm at sea, the use of the mechanism may not be practicable in certain situations. Similarly, while one can potentially reduce the effort necessary to unlock the mechanism by increasing the length of the moveable lever, an increase sufficient enough to allow one person to release the load secured by the mechanism may make the mechanism impracticably large.

Accordingly, there is a need for a tool that can secure high-tensile loads and that requires less effort to release the load than conventional tools.

SUMMARY

A release mechanism that decreases the effort necessary to release a tensile load is provided. The mechanism includes a connecting body that secures a member connected to a load between a fixed jaw and an opposing jaw, two floating links connected to a moveable jaw and to a moveable toggle pivot, and a moveable toggle that includes a central lever and two toggle links mounted on the moveable toggle pivot. A cam lobe is formed on the lever and rotation of the cam lobe against a flat rise included in the connecting body decreases the effort necessary to unlock the mechanism and release the load. The central lever is interspersed between the toggle links and can move between spacer/stops ("spacers") attached to each of the toggle links. The spacer/stops keep the lever from exceeding the prescribed range of motion.

In one embodiment, a toggle cam release mechanism is provided. The mechanism includes a connecting body, two floating links, and a moveable toggle. The connecting body includes a central plate including a flat rise, the connecting body further including two side plates securely attached to opposite sides of the central plate, a fixed jaw, and an opposing jaw pivotally mounted on a fixed pivot attached to the side plates to pivot between a released position and a locked position, wherein the fixed jaw and the opposing jaw abut and define a catchment recess when the fixed jaw is in the opposing jaw locked position. The two floating links are pivotally mounted on the opposing jaw and are moveable between a floating link locked position and a floating link released position by a moveable toggle pivot attached to the floating links. The moveable toggle includes: two toggle links interposed between the floating links and attached to the movable toggle pivot, each toggle link pivotably mounted on a fixed toggle pivot attached to the connecting body to pivot between a toggle link released position and a toggle link locked position, wherein an axis of the opposing jaw moveable pivot and an axis of the fixed toggle pivot are connectable by a line; a central lever attached to the moveable toggle pivot at an end interposed between the toggle links and moveable between a lever locked position and a lever released position by a force applied to a different end of the lever; a cam lobe formed on the end of the lever, a surface adjacent to the cam lobe abutting the flat rise when the lever is in the lever locked position, the cam lobe being rotatable against the flat rise to urge an axis of the moveable toggle pivot across the line to a releasing side of the line when the lever moves towards the lever released position; one or more release spacers positioned at each of the toggle links to block the lever from moving relative to the toggle links when the axis of the moveable toggle is on the releasing side of the line and the lever moves towards the lever released position, the release spacers urging the two toggle links to pivot into the toggle link released position upon receiving pressure from the lever, which urges the floating links to move into the floating link released position, which urges the opposing jaw to pivot on the opposing jaw fixed pivot into the opposing jaw released position; and one or more locking spacers positioned at each of the toggle links to block the lever from moving relative to the toggle links when the axis of the moveable toggle is on a locking side of the line and the lever moves towards the lever locked position, the locking spacers urging the two toggle links to pivot into the toggle link locked position upon receiving pressure from the lever, which urges the floating links to move into the floating link locked position, which urges the opposing jaw to pivot on the opposing jaw fixed pivot into the opposing jaw locked position.

In a further embodiment, a toggle cam mechanism for securing tensile loads is provided. The mechanism includes means for securely locking a member connected to a tensile load, means for linking an opposing jaw included in the locking means and a movable toggle, and the moveable toggle. The means for securely locking the member connected to the tensile load include a flat rise, a fixed jaw, and an opposing jaw pivotable on a fixed pivot between a released position and a locked position, wherein the locking means lock the connecting member between the fixed jaw and the opposing jaw when the opposing jaw is in the opposing jaw locked position. The means for linking the opposing jaw and the moveable toggle include two floating links moveable between a floating link locked position and a floating link released position. The moveable toggle includes: two toggle links interposed between the floating links and attached to a movable toggle pivot, each toggle link pivotably mounted on a fixed toggle pivot attached to the connecting body to pivot between a toggle link released position and a toggle link locked position, wherein an axis of the opposing jaw moveable pivot and an axis of the fixed toggle pivot are connectable by a line; a central lever attached to the moveable toggle pivot at an end interposed between the toggle links and moveable between a lever locked position and a lever released position by one or more forces applied to at least one of the end and a different end of the lever; camming means formed on the end of the lever, a surface adjacent to the camming means abutting the flat rise when the lever is in the lever locked position, the camming means being rotatable against the flat rise to urge an axis of the moveable toggle pivot across the line to a releasing side of the line when the lever moves towards the lever released position; means blocking the lever from moving relative to the toggle links when the axis of the moveable toggle is on the releasing side of the line and the lever moves towards the lever released position, the release blocking means urging the two toggle links to pivot into the toggle link released position upon receiving pressure from the lever, which urges the floating links to move into the floating link released position, which urges the opposing jaw to pivot on the opposing jaw fixed pivot into the opposing jaw released position and release the connecting member; and means for blocking the lever from moving relative to the toggle links when the axis of the moveable toggle is on a locking side of the line and the lever moves towards the lever locked position, the locking blocking means urging the two toggle links to pivot into the toggle link locked position upon receiving pressure from the lever, which urges the floating links to move into the floating link locked position, which urges the opposing jaw to pivot on the opposing jaw fixed pivot into the opposing jaw locked position and lock the connecting member.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
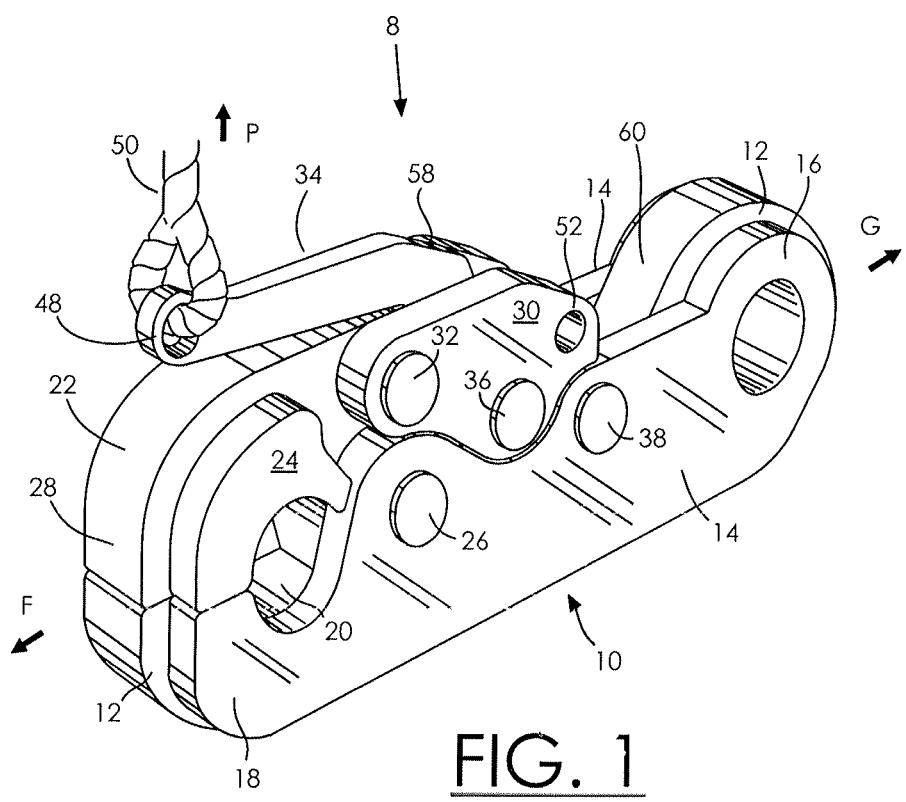
FIG. 1 is a perspective view of a toggle cam release mechanism in a locked position, in accordance with one embodiment.

FIG. 1 is a perspective view of a toggle cam release mechanism 8 in a locked position, in accordance with one embodiment. Ideally, the mechanism 8 is constructed of corrosion-resistant material, such as stainless steel plate, though other materials are possible. The mechanism 8 is referred to as being in the locked position when all moving parts of the mechanism 8 described below are in locked positions, and the mechanism 8 is referred to as being in the released position when all moving parts of the mechanism 8 described below are in the released position.

The toggle locking release mechanism 8 utilizes a 3-piece connecting body 10 that links the opposing tensile force vectors (F) and (G). The three-piece connecting body 10 includes a central plate 12 that is sandwiched between two side plates 14, either by welding, bolting, or other conventional method of attachment. Similar means of attachment can also be used for attaching other parts of the mechanism 8 to each other, unless specified otherwise. Formed on one end of the mechanism 8 is a closed eye 16 and at the other end of the mechanism 8 a fixed jaw 18. The fixed jaw 18 has a biased inner surface 46 that defines one side of a catchment recess 20 for receiving a connecting member 42, which is shown in this case to be a shackle. Other kinds of connecting members 42, such as a chain link, ring, or other suitable connecting member, may be used at either end of the connecting body 10.

An opposing pivoted jaw 22 having a biased inner surface 44 that defines the other side of the catchment recess 20 is pivotally carried by the body 10 at a fixed pivot 26 mounted on the side plates 14. While the fixed pivot 26 is shown as a stainless steel pin, the pivot 26 can also be a bolt, nut, or any other suitable axle member may be used at this and other pivot points in the mechanism 8.

Figure 2:
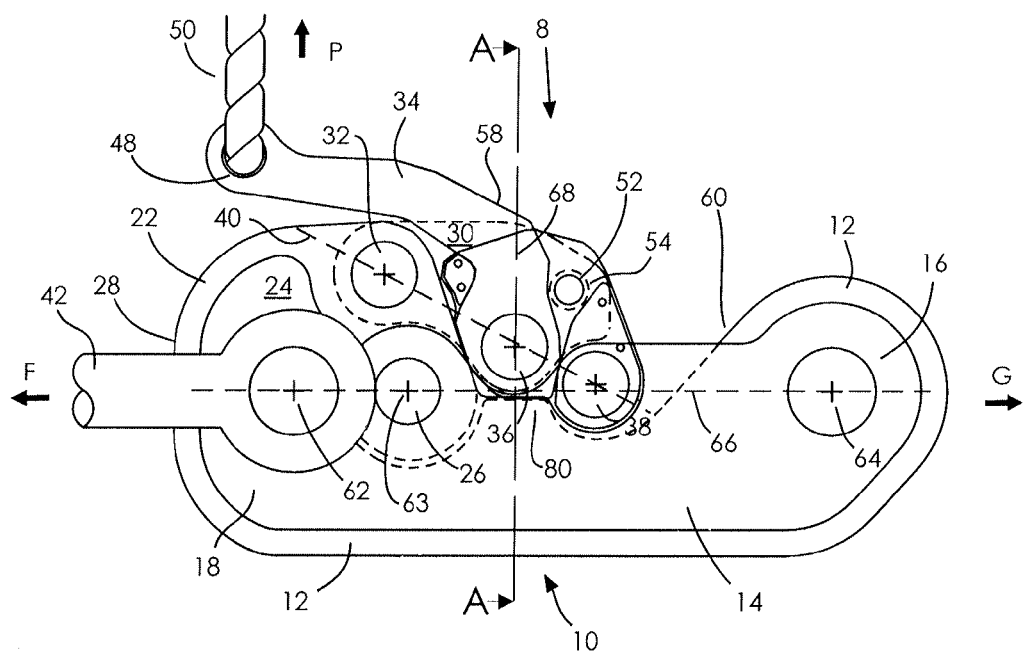
FIG. 2 is a plan view of the toggle cam release mechanism of FIG. 1 in a locked position, in accordance with one embodiment.
Figure 4:
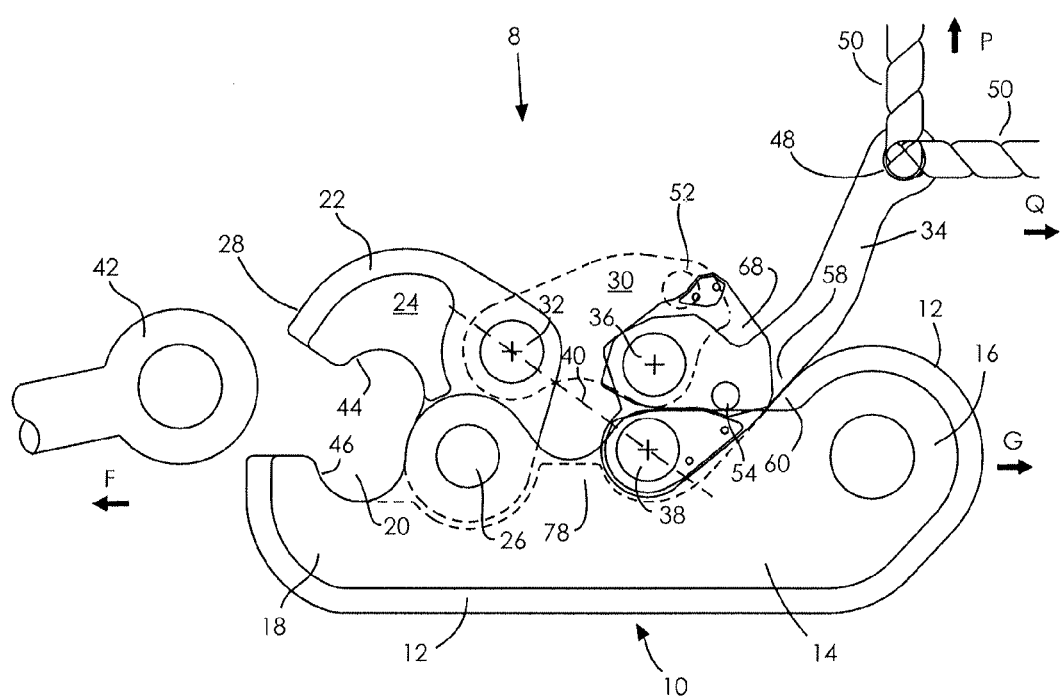
FIG. 4 is a plan view of the toggle cam release mechanism of FIG. 1 in a released position, in accordance with one embodiment.

The opposing pivoted jaw 22 is pivotally mounted on the body 10 to rotate about the axis of the pivot 26 by a moveable pivot 32 to thereby enable movement of the pivoted jaw 22 between the locked position shown in FIGS. 1 and 2, in which the outer limb 28 adjoins the fixed jaw 18 securely bridging the catchment recess 20, and the released position illustrated in FIG. 4, in which the outer limb 28 is drawn away from the fixed jaw 18, thus opening the catchment recess 20 and allowing free release of the connecting member 42. The opposing pivoted jaw 22 is shown sandwiched between two stiffening side plates 24 that are welded or otherwise attached to the jaw 22.

A pair of floating links or moveable lock/release links 30 have one end pivoted to and on each side of the opposing pivoted jaw 22 at the moveable pivot 32, and they are pivotally carried by a moveable toggle pivot 36, at the other end to pivot about the axis of the pivots 32 and 36 between the locked position shown in FIGS. 1 and 2 (showing the links 30 drawn toward the body 10) and the released position illustrated in FIG. 4 (showing the links 30 extended away from the body 10).

A central lever 34 is provided as part of a moveable toggle of the mechanism 8, as can be seen with reference to FIG. 2. FIG. 2 is a plan view of the toggle cam release mechanism 8 of FIG. 1 in a locked position, in accordance with one embodiment. The moveable toggle includes the central lever 34 attached to the movable toggle pivot 36 and two toggle links 68 attached to the movable toggle pivot 36 on each side of the central lever 34.

The toggle links 68 are interposed between the floating links 30, and thus, the central lever 34 is interposed between the toggle links 68 and the floating links 30. Each of the toggle links 68 is further pivotably mounted on a fixed toggle pivot 38 attached to the connecting body 10; the toggle links 68 can pivot on the fixed toggle pivot 38 between a locked position (drawn towards the opposing jaw 22), shown in FIGS. 1 and 2, and an released position (drawn towards the eye 16), shown in FIG. 4 described below.

The central lever 34 moves up on the movable toggle pivot 36 parallel to the motion of the toggle links 68 between a locked position shown in FIGS. 1 and 2 (showing the lever drawn towards the opposing jaw 22) and a released position shown in FIG. 4 (showing the lever 34 drawn towards the body and against the impact surface 60). However, the range of motion of the central lever 34 relative to the toggle links 68 is restricted by two spacer/stops ("spacer") attached to each of the toggle links: a release spacer 72 and a locking spacer 70. The spacers 70 and 72 prevent the lever 34 from exceeding a prescribed range of motion, which prevents the mechanism 8 from being damaged when a release of the load causes fast movements of parts within the mechanism 8. Keeping the lever 34 within the prescribed range of motion also protects the mechanism 8 from locking-up if the weight of the load attached to the connecting member overloads the mechanism 8, thus preventing additional efforts from been necessary to release the mechanism from the locked-up position.

In the description below, the term "releasing side" of the over-center line 40 that connects the pivots 32 and 38 refers to the side of the line 40 on which the axis of the moveable toggle pivot 36 is when the lever 34 is in the released position and the term "locking side" of the line 40 refers to the side of the line 40 on which the axis of the moveable toggle pivot 36 is when the lever 34 is in the locked position.

Each of the release spacers 72 is positioned on one of the toggle links 68 to be opposite of the other release spacer 72 attached to the other toggle link when the toggle links 68 are aligned. When the central lever 34 moves towards the released position shown in FIG. 4, lever 34 encounters both of the release spacers 72 right after the axis of the moveable toggle pivot 36 crosses the over-center line 40, with the spacers 72 blocking the lever 34 from moving further relative to the toggle links 68. As a force continues to be applied to the blocked lever 34, the lever 34 exerts pressure against the spacers 72, causing the release spacers 72 to urge the toggle links 68 to pivot into the released position, and allowing the lever 34 to move into the lever's 34 released position shown in FIG. 4.

Similarly, each of the locking spacers 70 is positioned on one of the toggle links 68 to be opposite of the other locking spacer 70 attached to the other toggle link 68 when the links 68 are aligned. When the central lever 34 moves towards the locked position from the released position, the lever 34 encounters both the locking spacers 70 right after crossing to a locking side of the over-center line 40, which block the lever 34 from moving further relative to the toggle links 68. As a force continues to be applied to the blocked lever 34, the lever 34 exerts pressure against the spacers 70, causing the locking spacers 70 to urge the toggle links 68 to pivot into the locked position, allowing the lever 34 to move into the lever's 34 locked position shown in FIGS. 1 and 2.

In a further embodiment, other ways to block the movement of the central lever 34 in relation to the toggle links 68 are possible. For example, two spacers attached to both of the toggle links 68 could block the movement of the lever 34 simultaneously relative to the toggle links 68 in either direction. Still other blocking means are possible.

As both the floating links 30 and the toggle links 68 are attached to the movable pivot 36, the movement of the toggle links 68 between the locked and the released positions urges that the floating links 30 to move between the locked and released positions respectively. In turn, the movement of the floating links 30 into the released position urges the opposing jaw 22 to pivot on the fixed pivot 26 into the released position, releasing the connecting member 42, while the movement of the floating links 30 into the locked position causes the opposing jaw 22 to pivot into locked position, thus securing the connecting member 42.

In the locked position illustrated in FIGS. 1 and 2, a portion of the lever 34 abuts a portion of the locking spacer 70, preventing the toggle links 68, and consequently the floating links 30 and the moveable jaw 22 from leaving the locked positions unless the lever 34 moves from the locked position. The relationship of the lever 34, the links 30 and 68, and the body 10 is such that no further movement of the links 30 and 68 and the opposing jaw 22 will occur. Any increase to tension applied in the direction of the force vector (F) and (G) to the connecting member 42 and partially applied to the pivoted jaw 22 will further tool block or lock up all the moving parts of the mechanism 8 to provide a secure locking connection.

Returning to FIG. 1, a pulling force exerted in the direction of the arrow P is connectable at the closed eye 48 formed at the outward end of the lever 34, thus urging the lever 34 toward and into the released position illustrated in FIG. 4, whereby the closed eye 48 is adapted to receive a remote release line 50 or other suitable connector. Alternatively, the angle of the lever 34 in the locked position, shown in FIGS. 1 and 2, relative to the body 10 of the mechanism 8, enables a pulling force to be exerted in the direction of the arrow Q (more or less perpendicular to the direction of the arrow P), connectable at the same closed eye that is formed at the outward end of the lever 34, thus urging the lever toward and into the released position illustrated in FIG. 4. Consequently, a user of the mechanism 8 is provided with means to release the mechanism 8 by exerting a pulling force in the direction of arrow P, or by exerting a pulling force in the direction of arrow Q, enabling use of the same remote release line 50 connected to a single point (the closed eye 48) on the lever 34.

The closed eye 16 on the one end of the body 10 is adapted to be connected to an outside structural member (not shown). An impact surface 58 on the lever 34 contacts an impact surface 60 formed on the upper portion of the closed eye 16 when the lever 34 is fully extended outward in the release position, as is illustrated in FIG. 4.

The outward end of the floating link 30 is provided with an aperture 52. Returning to FIG. 2, the aperture 52 is formed to align with an aperture 54 of the toggle links 68 when the floating links 30 and the toggle links 68 are in the locked positions. When aligned, the aperture 52 and the aperture 54 form a single opening adapted to receive a locking pin, such as a stainless steel hitch pin or other suitable locking member, so as to securely lock the mechanism 8 in the locked position and prevent inadvertent release of a load.

As can be seen in FIG. 2, the shape of the connecting body 10 and of the central lever 34 complement each other in a way that reduces the effort necessary to release of the lever 34 from the locked position. The central plate 12 of the connecting body 10 includes a flat rise 80. The central lever 34 includes a cam lobe 78 formed at the end of the lever 34 that is mounted on the movable toggle pin 36. When the lever 34 is in the locked position, a surface of the end that is adjacent to the cam lobe 78 aligns with and abuts the flat upper surface of the flat rise 80. When the force P or Q are applied to the lever 34 in the locked position, the cam lobe 78 rotates against the surface of the flat rise 80. The movement of the cam lobe 78 against the flat rise 80 urges the axis of the moveable toggle pivot 36 to cross to a releasing side the over-center line 40, which brings the lever 34 into a position that allows the catchment recess to open, as further described with reference to FIG. 3.

Specifically, the rotation of the cam lobe 78 against the flat rise 80 moves the axis of the moveable toggle pivot 36 away from the flat rise 80. As the flat rise 80 remains stationary in relation to the lever 34, the rotation of the cam lobe 78 against the flat rise 80 lifts the moveable toggle pivot 36 above the flat rise 80, which is attached to the end of the lever on which the cam lobe is formed. The lift is enough to bring the axis across the over-center line 40. The distance involved in lifting the axis of the moveable toggle pivot 36 above the flat rise 80 is less than the distance that of the moveable toggle pivot 36 would have to travel to cross the over-center line 40 via a pure rotational motion of the lever 34. Such a pure rotational motion is described in the U.S. Pat. No. 5,901,990 patent cited supra., where an axis of a moveable toggle pivot crosses an over-center line through a pivoting of a release lever on a fixed toggle pivot. As distance the axis of moveable toggle pivot 36 has to travel to cross over the line 40 is less in the mechanism 8 than in the mechanism described in the U.S. Pat. No. 5,901, 990 patent, the effort necessary to unlock the mechanism 8 is less than the efforts necessary to unlock the mechanism of the U.S. Pat. No. 5,901,990 patent. In one embodiment, the efforts necessary to unlock the mechanism 8 are ⅝ of the effort necessary to unlock the mechanism of the U.S. Pat. No. 5,901,990 patent, though other reductions in effort are possible in other embodiments.

While the above paragraph describes the cam lobe 78 lifting the axis of the movable toggle pivot 36, the motion of the axis would remain the same if the orientation of the mechanism 8 was changed. In the different orientations, the cam lobe 78 would move the axis of the moveable toggle pivot 36 across the over-center line 40 across from the flat rise 80.

Also, an additional stress-reducing feature is also provided in the mechanism 8 by the alignment of three load-bearing points along the same plane or centerline 66, as is illustrated in FIG. 2. These points include the axis 62 of the connecting member 42, the axis 63 of the fixed pivot 26, and the axis 64 of the closed eye 16. Thus, the load of tensile force vector (F) opposing vector (G) is shared equally by the fixed jaw 18 and the opposing pivoted jaw 22, preventing unnecessary loading of the releasing means and the resultant shock damage to the releasing means, and reducing the effort to release the mechanism 8.

Figure 3:
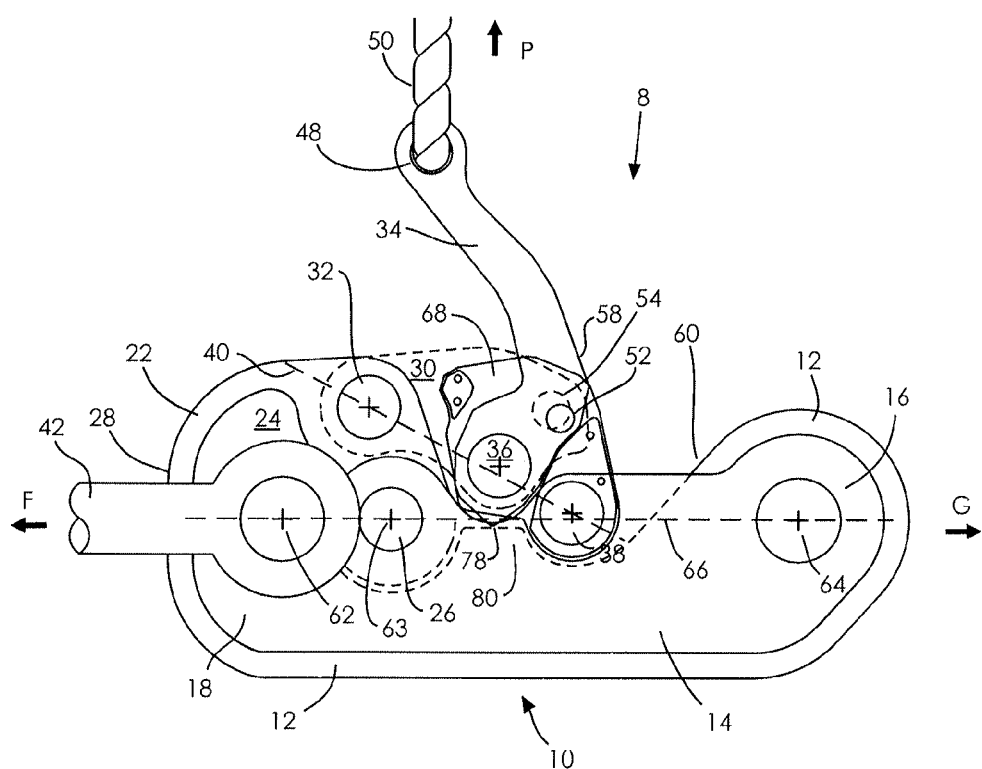
FIG. 3 is a plan view of the toggle cam release mechanism of FIG. 1 with the axis of the moveable toggle pivot being on the releasing side of the over-center line, in accordance with one embodiment.

The movement of the axis of the moveable toggle pivot 36 across the over-center line 40 allows the catchment recess 20 to open. FIG. 3 is a plan view of the toggle cam release mechanism of FIG. 1 with the axis of the moveable toggle pivot 36 being on the releasing side of the over-center line 40, in accordance with one embodiment. Movement of the axis of the moveable toggle pivot 36 to the releasing side of the over-center line 40 forces the lever 34 to move away from the locking spacers 70, thus removing any pressure that the toggle links 68 were receiving from the lever 34 to remain in the locked position. Furthermore, as the toggle links 68 and the floating links 30 are mounted on the moveable toggle pivot 36, the movement of the axis begins the movements of the floating links 30 and the toggle links 68 towards the released position, allowing the opposing jaw 22 to pivot into the released position if additional force is applied.

If a load of a sufficient weight is attached to the connecting member 42 when the movable toggle pivot 36 undergoes the over-center movement to the releasing side of the line 40, tension applied at the force vectors (F) and (G) by the member 42 to the biased inside surface 46 of the fixed jaw 22 will then urge further releasing movement to all working parts of the mechanism 8, bringing the of axis of the moveable toggle pivot 36 well past the over-center line 40. The biased inside surfaces 44 and 46 are formed so that tension at force vector (F) applied to the member 42 is equally distributed between the body 10 and the pivoted jaw 22, thereby reducing undue stress and friction to the moving parts of the mechanism 8 and facilitating ease in releasing the mechanism 8 when under tensile load.

If no load of a sufficient weight is attached to the connecting member 42 when the axis of the moveable toggle pivot 36 crosses the line 40, or if the connecting member 42 is not inserted into the catchment recess 20, continued application of a force is necessary to urge the lever 34, toggle links 68, floating links 30, and the opposing jaw 22 into the released positions. The application of the force can be accomplished through the lever 34, which contacts the release spacers 72 right after the axis of the moveable toggle pivot 36 crosses to a releasing side of the over-center line, and can apply pressure to the spacers 72 to cause the toggle links 68 to move into the released position. Therefore, continued application of pressure by the lever 34 would be necessary to bring the lever 34 into the released position.

While there are multiple forces that could bring the lever, the links 30 and 68, and the jaw 22 into the released positions from the positions shown in FIG. 3, returning these parts to locked positions from the positions shown in FIG. 3 requires an application of a force in a direction opposite to the direction of the forces P or Q. Right after that force would bring the axis of the moveable toggle pivot 36 to a locking side of the over-center line 40, the lever 34 contacts the locking spacers 70 and can apply pressure to the spacers 70 to bring the parts into the locked positions as described above.

FIG. 4 is a plan view of the toggle cam release mechanism of FIG. 1 in a released position, in accordance with one embodiment. As mentioned above, in this position, an impact surface 58 on the lever 34 contacts an impact surface 60 formed on the upper portion of the closed eye 16 when the lever 34 is fully extended outward. The toggle links 68 are drawn towards the eye 16. The floating links 30 are extended away from the body 10, and the moveable jaw 22 is away from the fixed jaw 18. An application of a force in a direction opposite to the direction of the forces P or Q is required to move the parts of the mechanism 8 to the positions described in FIG. 3 above.

Figure 5:
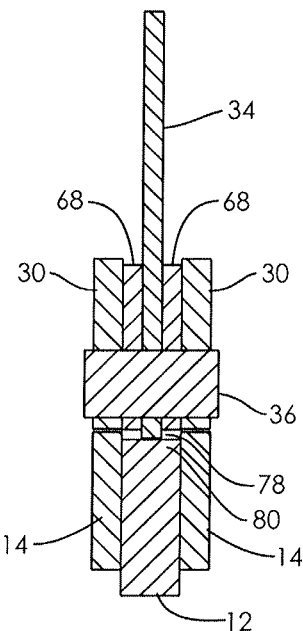
FIG. 5 is an exploded view of the A-A section shown in FIG. 2, in accordance with one embodiment.

Simultaneous movement of several parts of the mechanism 8 is partially accomplished through these parts all being mounted on the movable toggle pivot 36. FIG. 5 is an exploded view of the A-A section shown in FIG. 2 in accordance with one embodiment. The exploded view shows the spatial arrangements of components making up the moveable toggle together with the floating links 30. The central lever 34, the toggle links 68, and the floating links 30 are all attached to the moveable toggle pivot 36. The central lever 34 is interspersed between the two toggle links 68; together, the central lever 34 and the toggle links 68 are aligned with the central plate 12 of the connecting body 10. Each of the floating links 30 is adjacent to one of the toggle links 68, and thus, the toggle links 68 are interspersed between the floating links. Each of the floating links 30 is aligned with one of the side plates 14 of the connecting body 10.

Figure 6:
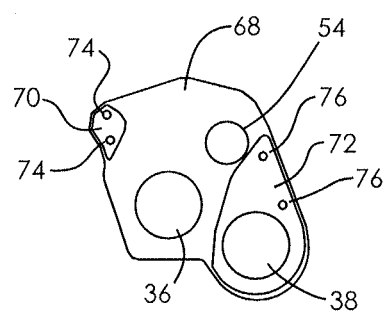
FIG. 6 is an exploded view of the toggle link shown in FIG. 2, in accordance with one embodiment.

As described above, the toggle links 68 are a part of the moveable toggle. FIG. 6 is an exploded view of the toggle links 68 shown in FIG. 2, in accordance with one embodiment. While the toggle links 68 of FIG. 6 are shown to be of a particular shape, other shapes are also possible. As mentioned previously, spacers 70 and 72 are attached to each of the toggle links 68. The spacers 70 and 72 can be secured to the toggle links using one or more spring pins 74, 76, though other securing means, such as other types of pins, bolts, and clamps, are possible. Both the release spacer 72 and the toggle link 68 include an opening 84, 86 through which the fixed toggle pivot 38 can pass. When a release spacer 72 is secured to a toggle link 68, the openings are aligned and the toggle can be mounted on the fixed toggle pivot 38 through the openings. The toggle links 68 also include an opening 82 through which the toggle link 68 can be mounted on the moveable toggle pivot 36, and an opening 54 that aligns with the aperture 52 as described above with reference to FIG. 1.

Figure 7:
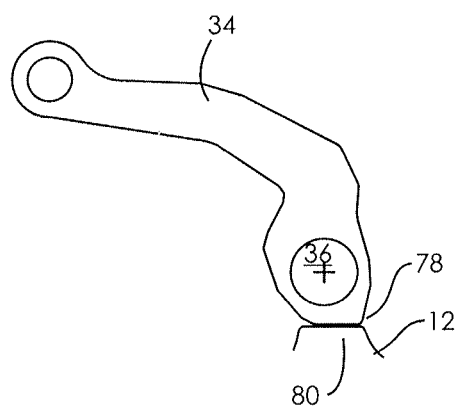
FIG. 7 is an exploded view of the central lever and the central plate rise of FIG. 2, in accordance with one embodiment.

FIG. 7 is an exploded view of the central lever 34 of FIG. 2. The lever 34 is shown mounted on the moveable toggle pivot 36 and is shown while abutting the flat rise of FIG. 2. The shape of the lever 34 complements the shape of the spacers 70 and 72. Thus, one side of the lever 34 forms a curved surface of 90 that is shaped to simultaneously press against each of the release spacers 72. Similarly, another side of the lever 34 forms a curved surface 88 that is shaped to simultaneously press against each of the locking spacers 70. Portions of the surface 90 abut portions the release spacers 72 when the moveable toggle pivot 36 crosses to the releasing side of the line 40, and pressure is applied by the lever 34 to the spacers 72 through the portions of the surface 90 abutting each of the spacers 72. Similarly, portions of the surface 88 abut portions of the locking spacers 70 when the moveable toggle pivot 36 crosses to the locking side of the line 40, and pressure is applied by the lever 34 to the spacers 70 through the portions of the surface of abutting each of the spacers 70.

While the invention has been particularly shown and described as referenced to the embodiments thereof, those skilled in the art will understand that the foregoing and other changes in form and detail may be made therein without departing from the spirit and scope of the invention.

What is claimed is:

1. A toggle cam release mechanism, comprising:
 a connecting body comprising a central plate comprising a flat rise, the connecting body further comprising two side plates securely attached to opposite sides of the central plate, a fixed jaw, and an opposing jaw pivotally mounted on a fixed pivot attached to the side plates to pivot between a released position and a locked position, wherein the fixed jaw and the opposing jaw abut and define a catchment recess when the fixed jaw is in the opposing jaw locked position;
 two floating links pivotably mounted on a movable pivot attached to the opposing jaw, the floating links moveable between a floating link locked position and a floating link released position by a moveable toggle pivot attached to the floating links; and
 a moveable toggle comprising:
  two toggle links interposed between the floating links and attached to the movable toggle pivot, each toggle link pivotably mounted on a fixed toggle pivot attached to the connecting body to pivot between a toggle link released position and a toggle link locked position, wherein an axis of the opposing jaw movable pivot and an axis of the fixed toggle pivot are connectable by a line;
  a central lever attached to the moveable toggle pivot at an end interposed between the toggle links and moveable between a lever locked position and a lever released position by one or more forces applied to at least one of the end and a different end of the lever;
  a cam lobe formed on the end of the lever, a surface adjacent to the cam lobe abutting the flat rise when the lever is in the lever locked position, the cam lobe being rotatable against the flat rise to urge an axis of the moveable toggle pivot across the line to a releasing side of the line when the lever moves towards the lever released position;
  one or more release spacers positioned at each of the toggle links to block the lever from moving relative to the toggle links when the axis of the moveable toggle is on the releasing side of the line and the lever moves towards the lever released position, the release spacers urging the two toggle links to pivot into the toggle link released position upon receiving pressure from the lever, which urges the floating links to move into the floating link released position, which urges the opposing jaw to pivot on the opposing jaw fixed pivot into the opposing jaw released position; and
  one or more locking spacers positioned at each of the toggle links to block the lever from moving relative to the toggle links when the axis of the moveable toggle is on a locking side of the line and the lever moves towards the lever locked position, the locking spacers urging the two toggle links to pivot into the toggle link locked position upon receiving pressure from the lever, which urges the floating links to move into the floating link locked position, which urges the opposing jaw to pivot on the opposing jaw fixed pivot into the opposing jaw locked position.

2. A toggle cam release mechanism according to claim 1, further comprising:
 one or more spring pins securing each of the release spacers and each of the locking spacers to the toggle links.

3. A toggle cam release mechanism according to claim 1, further comprising:
 a first curved surface formed on a side of the lever, wherein at least a portion of the surface is shaped to abut portions of the release spacers when the lever presses against the release spacers; and
 a second curved surface formed on an opposite side of the lever, wherein at least a portion of the second curved surface is shaped to abut portions of the locking spacers when the lever presses against the locking spacers.

4. A toggle cam release mechanism according to claim 3, wherein the first curved surface presses against the release spacers upon the axis of the moveable toggle crossing to the releasing side of the line and the second curved surface abuts the locking spacers upon the axis of the moveable toggle crossing to the locking side of the line.

5. A toggle cam release mechanism according to claim 1, further comprising:
 an opening formed in each of the release spacers; and an opening formed in each of the toggle links that is aligned with the release spacer opening when that release spacer is secured to that toggle link, wherein the fixed toggle pivot passes through the openings when the openings are aligned.

6. A toggle cam release mechanism according to claim 5, wherein the floating links and the toggle links each comprise an opening shaped to receive a securing pin and the openings are aligned when the lever is in the locked position.

7. A toggle cam release mechanism according to claim 1, wherein the opposing jaw leaves the opposing jaw locked position and opens the defined catchment recess upon the toggle links pivoting towards the toggle link released position while being urged by the release spacers.

8. A toggle cam release mechanism according to claim 1, wherein the rotation of the cam lobe moves the axis of the moveable toggle pivot over the line across from the flat rise.

9. A toggle cam release mechanism according to claim 1, wherein the defined catchment recess is adapted to secure a member connected to a tensile load.

10. A toggle cam release mechanism according to claim 1, wherein the lever further comprises means for attachment of means for the application of one or more of the forces.

11. A toggle cam mechanism for securing tensile loads, comprising:
a connecting body comprising a flat rise, a fixed jaw, and an opposing jaw pivotably on a fixed pivot between a released position and a locked position, wherein the connecting body locks a connecting member connected to a tensile load between the fixed jaw and the opposing jaw when the opposing jaw is in the opposing jaw locked position;
two floating links pivotably mounted on a movable pivot attached to the opposing jaw, the floating links moveable between a floating link locked position and a floating link released position by a moveable toggle pivot attached to the floating links; and
a moveable toggle comprising:
two toggle links interposed between the floating links and attached to the movable toggle pivot, each toggle link pivotably mounted on a fixed toggle pivot attached to the connecting body to pivot between a toggle link released position and a toggle link locked position, wherein an axis of the opposing jaw moveable pivot and an axis of the fixed toggle pivot are connectable by a line;
a central lever attached to the moveable toggle pivot at an end interposed between the toggle links and moveable between a lever locked position and a lever released position by one or more forces applied to at least one of the end and a different end of the lever;
camming means formed on the end of the lever, a surface adjacent to the camming means abutting the flat rise when the lever is in the lever locked position, the camming means being rotatable against the flat rise to urge an axis of the moveable toggle pivot across the line to a releasing side of the line when the lever moves towards the lever released position;
release blocking means for blocking the lever from moving relative to the toggle links when the axis of the moveable toggle is on the releasing side of the line and the lever moves towards the lever released position, the release blocking means urging the two toggle links to pivot into the toggle link released position upon receiving pressure from the lever, which urges the floating links to move into the floating link released position, which urges the opposing jaw to pivot on the opposing jaw fixed pivot into the opposing jaw released position and release the connecting member; and
locking blocking means for blocking the lever from moving relative to the toggle links when the axis of the moveable toggle is on a locking side of the line and the lever moves towards the lever locked position, the locking blocking means urging the two toggle links to pivot into the toggle link locked position upon receiving pressure from the lever, which urges the floating links to move into the floating link locked position, which urges the opposing jaw to pivot on the opposing jaw fixed pivot into the opposing jaw locked position and lock the connecting member.

12. A toggle cam mechanism according to claim 11, further comprising:
means for securing the release blocking means and the locking blocking means to the toggle links.

13. A toggle cam mechanism according to claim 11, further comprising:
a first curved surface formed on a side of the lever, wherein at least a portion of the surface is shaped to abut portions of the release blocking means when the lever presses against the release blocking means; and
a second curved surface formed on an opposite side of the lever, wherein at least a portion of the second curved surface is shaped to abut portions of the locking blocking means when the lever presses against the locking blocking means.

14. A toggle cam mechanism according to claim 13, wherein the first curved surface presses against the release blocking means upon the axis of the moveable toggle crossing to the releasing side of the line and the second curved surface presses against the locking blocking means upon axis of the moveable toggle crossing to the locking side of the line.

15. A toggle cam mechanism according to claim 11, further comprising:
an opening formed in the release blocking means; and
an opening formed in each of the toggle links that is aligned with the blocking means opening when that release blocking means is secured to that toggle link, wherein the fixed toggle pivot passes through the openings when the openings are aligned.

16. A toggle cam mechanism according to claim 15, wherein the floating links and the toggle links each comprise an opening shaped to receive securing means and the openings are aligned when the lever is in the locked position.

17. A toggle cam mechanism according to claim 11, wherein the opposing jaw leaves the locked position upon the toggle links pivoting towards the toggle link released position while being urged by the release blocking means.

18. A toggle cam mechanism according to claim 11, wherein the rotation of the camming means moves the axis of the moveable toggle pivot over the line across from the flat rise.

19. A toggle cam mechanism according to claim 11, wherein the two floating links are pivotal mounted on the opposing jaw and attached to the moveable toggle pivot.

20. A toggle cam mechanism according to claim 11, wherein the lever further comprises means for attachment of means for the application of one or more of the forces.

* * * * *